(12) United States Patent
Maki et al.

(10) Patent No.: US 8,021,451 B2
(45) Date of Patent: Sep. 20, 2011

(54) FINE α-ALUMINA PARTICLE

(75) Inventors: Hajime Maki, Niihama (JP); Yoshiaki Takeuchi, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 11/490,023

(22) Filed: Jul. 21, 2006

(65) Prior Publication Data
US 2007/0021292 A1 Jan. 25, 2007

(30) Foreign Application Priority Data
Jul. 25, 2005 (JP) ................................ 2005-213830

(51) Int. Cl.
*B24D 3/02* (2006.01)
*D24D 3/02* (2006.01)
*C09C 1/68* (2006.01)
*C09K 3/14* (2006.01)
*C04B 35/00* (2006.01)
*B28B 1/00* (2006.01)
*B28B 3/00* (2006.01)
*B28B 5/00* (2006.01)

(52) U.S. Cl. .......... 51/309; 501/153; 423/625; 264/680; 264/681

(58) Field of Classification Search ............... 51/309, 51/153; 501/153, 89, 87, 93; 423/625; 428/402 264/680, 681
See application file for complete search history.

(56) References Cited

U.S. PATENT DOCUMENTS

| 4,657,754 | A | 4/1987 | Bauer et al. |
|---|---|---|---|
| 5,284,809 | A | 2/1994 | Van Dijen |
| 5,627,116 | A * | 5/1997 | Zuk ........................ 264/1.21 |
| 6,048,577 | A | 4/2000 | Garg |
| 2002/0179755 | A1 | 12/2002 | Schillaci |
| 2003/0008761 | A1 * | 1/2003 | Yang ........................ 501/89 |
| 2003/0185746 | A1 | 10/2003 | Kajihara et al. |
| 2004/0186005 | A1 | 9/2004 | Maki et al. |
| 2004/0197263 | A1 * | 10/2004 | Wang ........................ 423/625 |
| 2004/0198584 | A1 * | 10/2004 | Wang ........................ 501/127 |
| 2005/0008565 | A1 * | 1/2005 | Maki et al. ................. 423/625 |
| 2005/0201928 | A1 * | 9/2005 | Maki et al. ................. 423/625 |
| 2006/0073093 | A1 | 4/2006 | Maki et al. |
| 2006/0087062 | A1 * | 4/2006 | Laine et al. ............... 264/645 |
| 2006/0210799 | A1 * | 9/2006 | Maki et al. ................. 428/402 |
| 2008/0308528 | A1 | 12/2008 | Wang |

FOREIGN PATENT DOCUMENTS

| EP | 0543347 A | 5/1993 |
|---|---|---|
| FR | 2825297 A | 12/2002 |
| FR | 2 834 711 A | 7/2003 |
| FR | 2876092 A | 4/2006 |
| JP | 62-128918 | 6/1987 |
| JP | 05-345611 | 12/1993 |
| JP | 10-101329 | 4/1998 |
| JP | 2001-151508 | 6/2001 |
| JP | 2005-001985 | 1/2005 |
| JP | 2005-154302 | 6/2005 |
| WO | 2004/089827 A2 | 10/2004 |

* cited by examiner

*Primary Examiner* — Anthony Green
*Assistant Examiner* — Pegah Parvini
(74) *Attorney, Agent, or Firm* — Sughrue Mion, PLLC

(57) ABSTRACT

The present invention provides a fine α-alumina particle having a degree of α-transformation of not less than 95%, a BET specific surface area of not less than 10 $m^2/g$, a degree of necking of not more than 30%, and a total content of Si, Fe, Cu, Na and Mg of not more than 500 ppm.

15 Claims, No Drawings

FINE α-ALUMINA PARTICLE

BACKGROUND OF THE INVENTION

1. Field of the Invention

The present invention relates to a fine α-alumina particle.

2. Related Background Art

A fine α-alumina particle is composed of fine particles of alumina ($Al_2O_3$), having an α-phase as its main crystalline phase, and is used as a starting material for producing, for example, α-alumina sintered body (See JP-A-2005-1984 and JP-A-2005-1985). The fine α-alumina particle is required to be capable of giving sintered body with a high strength and a high density.

In order to develop a fine α-alumina particle capable of giving sintered body with a high strength and a high density, the present inventors have made earnest studies, and as a result, have accomplished the present invention.

SUMMARY OF THE INVENTION

The present invention provides a fine α-alumina particle having a degree of α-transformation of not less than 95%, a BET specific surface area of not less than 10 m²/g, a degree of necking of not more than 30%, and a total content of Si, Fe, Cu, Na and Mg of not more than 500 ppm.

The fine α-alumina particle of the present invention can provide α-alumina sintered body with a high strength and a high density.

DETAILED DESCRIPTION OF THE INVENTION

The fine α-alumina particle of the present invention is composed of fine particles of alumina, having an α-phase as its main crystalline phase. The degree of α-transformation of the fine α-alumina particle is not less than 95% from the viewpoint of the strength of α-alumina sintered body obtained therefrom, and it may have a degree of α-transformation of 100% and not contain other crystalline forms nor amorphous forms. Here, the degree of α-transformation is determined by the following equation (1):

$$\text{Degree of α-transformation} = I_{25.6}/(I_{25.6}+I_{46}) \times 100(\%) \quad (1)$$

wherein $I_{25.6}$ is a peak height of an α-alumina phase (012 face) appearing at a position of 2θ=25.6° in a powder X-ray diffraction spectrum, and $I_{46}$ is a peak height of a γ, η, χ, κ, θ or δ-alumina phase appearing at a position of 2θ= around 46°.

The BET specific surface area is not less than 10 m²/g from the viewpoint of the strength of the resulting α-alumina sintered body obtained therefrom, preferably not less than 13 m²/g, more preferably not less than 15 m²/g, and it is usually not more than 150 m²/g, preferably not more than 100 m²/g.

The degree of necking is not more than 30% from the viewpoint of the strength of the α-alumina sintered body obtained therefrom, preferably not more than 15%, more preferably 0% with no particles joining to others. Here, the degree of necking is a ratio of particles joining to others in the fine α-alumina particle, in terms of the number of particles, and obtained by observing not less than 20 particles of α-alumina with a transmission electron microscope (TEM) and counting a number of particles joining to others.

The total content of Si, Fe, Cu, Na and Mg is not more than 500 ppm from the viewpoint of the density of the resulting α-alumina sintered body obtained therefrom, preferably not more than 100 ppm. The total content is obtained by an emission spectral analysis in terms of metal element based on the fine α-alumina particle.

The fine α-alumina particle of the present invention has preferably an ignition loss of not more than 0.5%, more preferably not more than 0.4%.

The fine α-alumina particle of the present invention has usually a particle diameter of from 10 nm to 200 nm, and usually a center particle diameter of from 10 nm to 150 nm. The fine α-alumina particle may include particles having a particle diameter of more than 200 nm, but in such a case, the number ratio of such particles is preferably not more than 1%, more preferably not more than 0.1%.

The fine α-alumina particle of the present invention can be produced by:

(1) grinding a seed crystal precursor by using a grinder to give seed crystal particles, wherein the seed crystal precursor is selected from unground α-alumina particles and unground diaspore particles, which has a total content of Si, Fe, Cu, Na and Mg of not more than 500 ppm, and the grinder has a lining made of a synthetic resin or alumina having a purity of not less than 99% by mass on the surface with which the seed crystal precursor contacts;

(2) mixing in a wet condition the obtained seed crystal particles with an α-alumina precursor having a total content of Si, Fe, Cu, Na and Mg of not more than 500 ppm to obtain a mixture; and (3) calcining the obtained mixture.

The unground α-alumina particles used as the seed crystal precursor are unground particles produced by calcining α-alumina precursor particles. The unground diaspore particles also used as the seed crystal precursor are particles of diaspore, which are not ground. The α-alumina and the diaspore each have peaks in a range of 45°≦2θ≦70° in an X-ray diffraction spectrum Also the unground α-alumina particles and the unground diaspore particles each have a total content of Si, Fe, Cu, Na and Mg of not more than 500 ppm, preferably not more than 100 ppm. The unground α-alumina particles of such purity can be produced by using aluminum salts, aluminum alkoxides or aluminum hydrolysates of high purity as α-alumina precursor. And, the unground diaspore particles of such purity can be produced by hydrothermal synthesizing aluminum hydrolysates of high purity.

Each particle of the seed crystal precursor has usually a particle diameter of from 50 nm (0.05 μm) to 0.5 μm, and may be a fine particle having a particle diameter of about 10 nm (0.01 μm).

The seed crystal precursor may be ground in a wet condition i.e., in the presence of a liquid such as water, or may be ground in a dry condition without any liquid such as water. Among them the wet grinding method, in which particles are ground in wet condition, is preferred.

As the liquid used in a wet grinding method, water is usually used, and ion exchanged water is preferably used. The liquid may include a dispersant Examples of the dispersant may include, for instance, inorganic acids such as nitric acid, hydrochloric acid and sulfuric acid; organic acids such as oxalic acid, citric acid, acetic acid, malic acid and lactic acid; alcohols such as methanol, ethanol and propanol; water-soluble aluminum salts such as aluminum chloride, aluminum oxalate, aluminum acetate and aluminum nitrate; surfactants such as poly(ammonium carboxylate); and the like. The inorganic acids or aluminum salts are preferably used. The dispersant may be used alone or in combination of two or more kinds. The dispersant is used in an amount of usually 0.01 parts by mass or more, preferably 0.05 parts by mass or more, more preferably 0.1 parts by mass or more, further preferably 0.3 parts by mass or more, most preferably 0.5 parts by mass or more, and usually 20 parts by mass or less, preferably 10 parts by mass or less, more preferably 5 parts by mass or less, further preferably 1.5 parts by mass or less, based on 100 parts by mass of the liquid.

As the grinder used in the wet grinding method, a medium-stirring mill, which grinds the seed crystal precursor by stirring it with ball-like medium together, or a ball mill may be used, and the medium-stirring mill is preferably used. When the medium-stirring mill is used, a centrifugation method, in which the medium is removed from ground mixture by centrifugation, a gap separator method, in which the medium is removed from the ground mixture by passing the ground mixture through a gap that is narrower than the medium, and a cartridge separator method, in which is used a cartridge comprising a filter having a mesh that may allow the ground mixture pass through but not allow the medium pass through, may be used for separating the grinding medium from seed crystal particles after ground, and the centrifugation method is preferably used.

In a dry grinding method in which the seed crystal precursor is ground in a dry condition, the seed crystal precursor may be ground alone, but additives such as a grinding aid and a deflocculant are preferably added thereto, because, in such a case, the grinding can be conducted sufficiently in a short period of time. Examples of the grinding aid may include alcohols such as methanol, ethanol and propanol; glycols such as propylene glycol, poly(propylene glycol) and ethylene glycol; amines such as triethanolamine; higher fatty acids such as palmitic acid, stearic acid and oleic acid; aluminum alkoxides; carbon materials such as carbon black and glaphite, and the like. These grinding aids may be used alone or in combination of two or more kinds. The grinding aid may be typically used in an amount of from 0.01 parts by mass to 10 parts by mass, preferably from 0.5 parts by mass to 5 parts by mass, more preferably from 0.75 parts by mass to 2 parts by mass, based on 100 parts by mass of the seed crystal precursor.

As the grinder used in the dry grinding method, for example, ball mills such as a tumbling mill, a vibrating ball mill and a planetary mill; high speed rotation mills such as a pin mill; a medium-stirring mill and a jet mill may be used.

In the above-mentioned process, the grinder used for grinding the seed crystal precursor in the wet grinding method or dry grinding method is one having a lining made of a synthetic resin or alumina having a purity of not less than 99% by mass on the surface with which the seed crystal precursor contacts. Examples of the synthetic resin includes fluororesins such as polytetrafluoroethylene, polyvinylidene fluoride, polytrifluoroethylene, fluoroethylene-ehtylene copolymer; urethane resins; olefin resins such as polyethylene and polypropylene, and the like. As the grinders, medium stirring mill such as "Star Mill LMZ 2" (centrifugation method) made by Ashizawa Fine Tech Co., Ltd., "DYNO MILL" (gap separator method) made by Shinmaru Enterprises Corporation, and the like are commercially available.

It is preferable that the seed crystal precursor is ground so that a half width (H) of a main peak in the range of $45° \leq 2\theta \leq 70°$ in X-ray diffraction spectrum is not less than 1.02 times of a half width ($H_0$) before ground. When using the dry grinding method, it is more preferably that the half width (H) is not less than 1.06 times of the half width ($H_0$) before ground.

After grinding, it is preferable to obtain the seed crystal particles by removing coarse particles through a centrifugal separation in an aqueous medium under conditions that a product of a centrifugal acceleration (G) and a centrifugal processing time (minute) is preferably not less than 140,000 (G·minute), more preferably not less than 170,000 (G·minute), particularly preferably not less than 200,000 (G·minute), and usually not more than 1,200,000 (G·minute). The coarse particles are settled down through the centrifugal separation; nevertheless, a supernatant liquid includes fine particles that have not settled down and disperse therein. Thus, fine seed crystal particles can be obtained by separating the supernatant liquid from the precipitate.

After grinding, it is also preferable to obtain the seed crystal particles by removing coarse particles through a filtration in an aqueous medium by using a filter having a pore radius of not more than 1 μm, more preferably not more than 0.7 μm, further preferably not more than 0.3 μm, and usually not less than 0.01 μm, more preferably not less than 0.05 μm. Thus, fine seed crystal particles can be obtained as the filtrate, which includes fine particles dispersing therein.

As the aqueous medium used in the centrifugel separation or the filtration, water is usually used, and ion exchanged water is preferably used. The aqueous medium may include a dispersant. Examples of the dispersant may include inorganic acids such as nitric acid, hydrochloric acid and sulfuric acid; organic acids such as oxalic acid, citric acid, acetic acid, malic acid and lactic acid; alcohols such as methanol, ethanol and propanol; water-soluble aluminum salts such as aluminum chloride, aluminum oxalate, aluminum acetate and aluminum nitrate surfactants such as poly(ammonium carboxylate); and the like. The inorganic acids or aluminum salts are preferably used. The dispersant may be used alone or in combination of two or more kinds. The dispersant is used in an amount of usually from 0.01 parts by mass to 20 parts by mass, preferably from 0.05 parts by mass to 10 parts by mass, more preferably from 0.1 parts by mass to 5 parts by mass, based on 100 parts by mass of the aqueous medium.

Instruments used when obtaining the seed crystal particles, such as a mixing vessel used when mixing the seed crystal precursor with the aqueous medium, an instrument for stirring, a container for storing the mixture of powder after ground and aqueous medium to be conducted the centrifugal separation or filtration, and a pump used for sending the mixture, preferably have a structure whose metallic parts do not contact with the seed crystal particles, the seed crystal precursor or the aqueous medium, more preferably have a structure whose metallic parts, which are likely to contact with the seed crystal particles, the seed crystal precursor or the aqueous medium, are coated with a fluororesin. For examples LEV series made by IWAKI & Co. LTD., which is a type of magnetic levitating non contact centrifugal pump and whose metallic parts are coated with Teflon (trade mark), are preferable as the pump to prevent contamination of metal.

The α-alumina particles or diaspore particles obtained as the seed crystal particles have usually a center particle diameter of not more than 30 nm; a number ratio of particles having a particle diameter of more than 100 nm of not more than 1% in terms of the number of particles; and a total content of Si, Fe, Cu, Na and Mg of not more than 500 ppm.

Then, the thus obtained seed crystal particles are mixed in a wet condition with an α-alumina precursor to obtain a mixture.

The α-alumina precursor is a compound capable of transiting to an α-alumina with calcination. Examples of the α-alumina precursor may include aluminum salts, aluminum alkoxides, aluminum hydrolysates, transition aluminas, and the like.

Examples of the aluminum salts include inorganic aluminum salts such as aluminum nitrate, aluminum ammonium nitrate, aluminum chloride, aluminum sulfate, ammonium alum, and aluminum ammonium carbonate; organic aluminum salts such as aluminum oxalate, aluminumacetate, aluminum stearate, aluminum lactate and aluminum laurate; and the like.

Examples of the aluminum alkoxides include aluminum isopropoxide, aluminum ethoxide, aluminum sec-butoxide, aluminum tert-butoxide, and the like.

Examples of the aluminum hydrolysates includes gibbsite type, bayerite type, Nordstrandite type, boehmite type, pseudo-boehmite type and amorphous aluminum oxides, which can be obtained by hydrolyzing aqueous solutions of the above-mentioned aluminum salts or aluminum alkoxides.

The transition alumina is not an α-alumina, examples thereof include, for example, γ-alumina, d-alumina, θ-alumina, or the like.

The α-alumina precursor has a total content of Si, Fe, Cu, Na and Mg of not more than 500 ppm, preferably not more than 100 ppm. The α-alumina precursor of such purity may be produced by common methods using aluminummetal of high purity as a starting material. Aluminum metal of high purity of not less than 99.99% is commercially available. Aluminum salts or aluminum alkoxides of high purity are also commercially available.

The seed crystal particles are used in an amount of usually from 0.01 parts by mass to 50 parts by mass, preferably from 1 part by mass to 40 parts by mass, more preferably from 2 parts by mass to 25 parts by mass, in terms of alumina, based on 100 parts by mass of the total of the seed crystal particles and from α-alumina precursor.

As the method for mixing the seed crystal particles and the α-alumina precursor, for instance, the seed crystal particles and the α-alumina precursor may be mixed in an aqueous medium. As the aqueous medium used, water is usually used, and ion exchanged water is preferably used. The aqueous medium is used in an amount of usually from 1 times by mass to 50 times by mass, preferably from 5 times by mass to 40 times by mass, more preferably from 10 times by mass to 30 times by mass, to the total of the seed crystal particles and the α-alumina precursor. The aqueous medium may include a dispersant. Examples of the dispersant may include inorganic acids such as nitric acid, hydrochloric acid and sulfuric acid; organic acids such as oxalic acid, citric acid, acetic acid, malic acid and lactic acid; alcohols such as methanol, ethanol and propanol; water-soluble aluminum salts such as aluminum chloride, aluminum oxalate, aluminum acetate and aluminum nitrate; surfactants such as poly(ammonium carboxylate); and the like. The inorganic acids or aluminum salts are preferably used. The dispersant may be used alone or in combination of two or more kinds. The dispersant is used in an amount of usually from 0.01 parts by mass to 20 parts by mass, preferably from 0.05 parts by mass to 10 parts by mass, more preferably from 0.1 parts by mass to 5 parts by mass, based on 100 parts by mass of the aqueous medium.

When a water-insoluble α-alumina precursor is used, the α-alumina precursor is usually dispersed in an aqueous medium, to which the seed crystal particle is added and stirred, thereby they are mixed. When a water-soluble α-alumina precursor is used, the α-alumina precursor is usually dissolved in an aqueous medium to be a solution, to which the seed crystal particle is added and stirred. In each case, the seed crystal particle may be added to the aqueous medium in a form of a dry powder, or in a form of dispersion in an aqueous medium like water. The stirring may be conducted with a medium-stirring mill using medium, however, from the viewpoint of possible avoidance of incorporation of impurity from the medium, it is preferably conducted without using the medium. Examples of dispersion device, which is capable for stirring without using medium, include, for example, super-sonic wave mixer, homogenizer, ultra high pressured homogenizer, continuous homogenizer, a dispersion device having a mode of dispersing by collision between two fluids, which is commercially available from YOSHIDA KIRAI KOGYO.

After they are mixed, a uniform mixture of the seed crystal particle and the α-alumina precursor can be obtained, for example, by evaporating the aqueous medium. The evaporation to usually conducted at a temperature of not more than 300° C. using a dryer such as a tray dryer, a slurry dryer, a spray-dryer.

When an aluminum hydrolysate obtained by hydrolyzing a solution containing an aluminum salt or alkoxide is used as the α-alumina precursor, the seed crystal particle can be mixed in wet condition with the aluminum hydrolysate by adding the seed crystal particle to the solution, and hydrolyzing the resulting dispersion. The seed crystal particle may be added in the form of a dry powder, or in a form of dispersion in an aqueous medium like water.

Then, the thus obtained mixture is calcined. It is calcined at a temperature of usually not less than 700° C., preferably not less than 800° C. from the viewpoint of easy obtain ability of a fine α-alumina particle with a high degree of α-transformation, and at a temperature of usually not more than 1100° C., preferably not more than 1000° C. from the viewpoint of smaller amount of neckings of particles.

The temperature elevating rate upon heating is, for instance, from 60° C./hour to 1200° C./hour, preferably from 100° C./hour to 500° C./hour.

In some α-alumina precursors, wlth the elevation of the temperature, gaseous by-products maybe produced at a temperature of less than 700° C. when the α-alumina precursor is transformed to an α-alumina. In such a case, the mixture may be kept at a temperature of less than 700° C., preferably not more than 600° C., until the generation of the by-products finishes, then the temperature may be elevated to the above-mentioned calcining temperature range.

The calcination may be conducted in the air or in an inert gas atmosphere such as nitrogen gas or argon gas. The calcination is desirably conducted under the atmosphere of a high partial water vapor pressure, because a low partial water vapor pressure tends to result in a high degree of necking.

The calcination may be conducted using a usual calcining furnace such as a tubular electric furnace, a box electric furnace, a tunnel furnace, a far infrared ray furnace, a microwave oven, a shaft furnace, a reverberatory furnace, a rotary furnace, or a roller hearth kiln. The calcination may be conducted in a batch method or a continuous method. Further, the calcination may be conducted in a stationary state or a fluid state. In the present invention, contamination of a metal in the calcining furnace is preferably avoided by, for example, using a container made of ceramics, which is covered with a lid.

The calcination time is a time enough for thoroughly turning into the α-alumina from its precursor, which depends on the kind and amount of the seed crystal particles used, the kind of the α-alumina precursor, the calcination temperature and the composition of the gas in atmosphere, and it is usually about not less than 10 minutes and about not more than 24 hours.

As a process for producing an α-alumina sintered body from the thus obtained fine α-alumina particle of the present invention, for instance, a process comprising the steps of:
(A) shaping the fine α-alumina particle of the present invention to obtain an α-alumina green body, and
(B) sintering the obtained α-alumina green body, may be exemplified.

Since the fine α-alumina particle is agglomerated to others in many cases just after calcination, using an air flow grinder such as a jet mill or a grinder such as a vibrating mill, the agglomerates are usually cracked, and then is used for producing the α-alumina sintered body.

The process for shaping the fine α-alumina particle of the present invention is not particularly limited, which may be, for instance, a process comprising the steps of: filling the fine α-alumina particle of the present invention into a mold and pressing it in a usual manner such as uniaxial pressing or cold isostatic pressing. Molds may usually be made of metals. By shaping the fine α-alumina particle in such a manner, an α-alumina green body having a shape along with the mold shape can be obtained.

The process for shaping the fine α-alumina particle of the present invention may include a process comprising the steps of:
(A1) dispersing the fine α-alumina particle of the present invention in an aqueous medium to obtain an α-alumina slurry;
(A2) drying the obtained α-alumina slurry to obtain an α-alumina green body.

The process for shaping the fine α-alumina particle of the present invention may include a process comprising the steps of:
(A1') dispersing the fine α-alumina particle of the present invention in an aqueous medium to obtain an α-alumina slurry;
(A2') spray-drying the obtained α-alumina slurry to obtain α-alumina granules; and
(A3') compacting the obtained α-alumina granules to obtain an α-alumina green body.

The aqueous medium may be, for instance, water. The content of the fine α-alumina particle in the α-alumina slurry depends on the spray-dry condition, the desired particle size of the α-alumina granules, and the like, and it is usually from 5% by mass to 50% by mass of the α-alumina slurry. The α-alumina slurry is preferably dispersed using a dispersion device which does not use a dispersing medium such as alumina balls for dispersing the fine α-alumina particle in the medium, or a medium-stirring disperser having a mechanism wherein a dispersing medium is separated from the slurry by means of centrifugal separation. A dispersion device having a lining made of a synthetic resin or alumina having a purity of not less than 99% on the surface with which fine α-alumina particle and the aqueous medium contact is preferably used for preventing contamination from dispersion device.

α-Alumina granules obtained by spray-drying the α-alumina slurry have usually a particle diameter of from 1 μm to 100 μm. The obtained α-alumina granules are filled in a mold, and a usual pressing method such as a uniaxial pressing or cold isostatic pressing is conduced to obtain an α-alumina green body.

The molded α-alumina green body is usually slntered in the air at from 1,000° C. to 1,700° C. for a sintering time of from 1 hour to 12 hours.

The thus obtained α-alumina sintered body have not only a high strength but also a high density, and accordingly can be used as cutting tools, bioceramic, bulletproof boards, parts for a semiconductor-produoing apparatus, such as a wafer handlers used for handling silicon wafer in a semiconductor production step, electronic parts such as an oxygen sensor, translucency tubes making up a sodium lamp or metal halide lamp, and the like.

The fine α-alumina particle of the present invention can be used, for instance, as a starting material for producing ceramic filters used for removing solids from gas such as exhaust gas, and filtration of aluminum melt or food such as beer. Examples of the ceramic filters include selective permeable filters used for selectively permeating hydrogen in fuel batteries, or gas components generated upon petroleum refining, carbon monooxide, carbon dioxide, nitrogen, or oxygen. These selective permeable filters may be used as a catalyst support in which a catalyst component is supported on the surface thereof.

Further, the fine α-alumina particle of the present invention may be used as additives for cosmetics, a brake lining or catalyst supports, and materials for conductive sintered bodies, heat-conductive sintered bodies or the like. In addition, the fine α-alumina particle of the present invention may be used as sintering aids, which is added to a ceramic powder that is hardly sintered, and makes the powder easily sintered to produce a gintered body.

By using the fine α-alumina particle of the present invention as a starting material, fine aluminum nitride powder, yttrium-aluminum-garnet (YAG) powder, and powdery fluorescent substance can be produced.

The fine α-alumina particle of the present invention may also be used, like usual α-alumina powder, as additives for improving head-cleaning property and abrasion resistance of a coating layer in a coating-type magnetic media in the state of a powder. In addition, it may be used as a toner or a filler to be added to resins.

Still further, the fine α-alumina particle of the present invention may be preferably used as an abrasive. For example, the fine α-alumina particle of the present invention is dispersed in an aqueous medium like water using a dispersion device to give slurry, and the resulting slurry may be used for grinding semiconductor CMP, hard disk substrates or the like. By using the fine α-alumina particle of the present invention as an abrasive, it is possible to obtain more smooth polished face. Also the fine α-alumina particle of the present invention may be coated on a surface of a tape to give a polishing tape, and the tape may be used for precision polish of hard disks or magnetic heads.

EXAMPLES

The present invention will be described in detail by means of Examples, but the present invention is not limited thereto.
<1> The degree of α-transformation was calculated by the following equation (2):

$$\text{Degree of } \alpha\text{-transformation} = I_{25.6}/(I_{25.6}+I_{46}) \times 100\% \tag{2}$$

wherein $I_{25.6}$ is a peak height of an α-phase (012 face) appearing at a position of 2θ=25.6°, and $I_{46}$ is a peak height of a γ, η, χ, κ, θ, or δ-phase appearing at a position of 2θ= around 46° in a powder X-ray diffraction spectrum obtained using a powder X-ray diffraction instrument (RINT2000 manufactured by Rigaku Corporation) in CuKa radiation at a tube voltage of 40 kV and a tube current of 20 mA.
<2> The degree of necking was obtained by observing not less than 20 α-alumina particles in a transmission electron microscope (TEM) photograph and counting a number of particles joining to others.
<3> The BST specific surface area was found according to a nitrogen adsorption method.
<4> The center particle diameter was measured according to the following measuring method 1 to 3:
[measuring method 1] measuring as a particle diameter (D50) corresponding to a cumulative percentage 50% by mass, using a dynamic light scattering particle size distribution measuring device ("Nanotrac (UPA-EX150)" made by NIKKISO Co., Ltd.).
[measuring method 2] measuring as a particle diameter (D50) corresponding to a cumulative percentage 50% by mass, using a laser diffraction particle size distribution measuring device ("Microtrac HRA(X-100)" made by NIKKISO Co., Ltd.).
[measuring method 3] measuring as a number average particle diameter from electron microscope photograph taken by a transmission electron microscope (TEM) or a scanning electron microscope (SEM).
<5> The degree of grinding was calculated by the following equation (3):

degree of grinding=$H(116)/H_0(116)$ (3)

wherein H(116) is a peak after grinding and $H_0(116)$ is a peak before grinding, both peak appearing at a position of 2θ=57.5° on an α-phase (116) face in a powder X-ray diffraction spectrum obtained using a powder X-ray diffraction instrument.
<6> The ignition loss was obtained as follows: After a sample is ground, it is weighed into a platinum vessel (W g), and the mass (W1 g) of the platinum vessel containing the sample is measured. The vessel is ignited at 1,100° C for 1 hour in the air. After cooling the vessel, the mass (W2 g) of the platinum vessel containing the sample is measured, and the ignition loss is found in the following equation (4):

ignition loss(%)=$(W1-W2)/W \times 100 - M(\%)$ (4)

wherein M is a dry loss found in the equation (5):

$M=(A-B)/A \times 100(\%)$ (5)

wherein A is a mass (g) of the sample, and B is a mass (g) of the sample heated at 200° C. for 1 hour in the air.
<7> The contents of Si, Fe, Cu, Na and Mg were obtained according to an emission spectral analysis as the contents of each metal element based on a fine α-alumina particle or seed crystal particles.

Example 1

(Production of Seed Crystal Particles)
An aluminum isopropoxide of high purity was hydrolyzed to obtain aluminum hydroxide, which was calcinated to obtain a transition alumina having a θ-phase as a main crystalline phase and degree of α-transformation of 3%. The obtained transition alumina was ground by using a jet mill to obtain a transition alumina powder having a bulk density of 0.21 g/cm³.
The transition alumina powder was calcined at a maximum temperature of 1,170° C. for an average residence time of 3 hours in a calcining furnace in which the inside was adjusted at a dew point of −15° C. (a partial water vapor pressure: 165 Pa) by continuously throwing the powder into the furnace, and at the same time, continuously removing the calcined powder there from, to obtain unground α-alumina particles having a BET specific surface area of 14 m²/g. The unground α-alumina particles had a Si content of less than 1 ppm (lower detection limit), a Fe content of not more than 2 ppm, a Cu content of less than 1 ppm (lower detection limit), a Na content of 6 ppm, and a Mg content of less than 1 ppm (lower detection limit).
The resulting unground α-alumina particles 20 parts by mass were mixed with an aqueous aluminum chloride solution (aluminum chloride concentration: 0.01 mole/liter) 80 parts by mass, and the mixture was continuously wet ground in a wet method grinding device ("Star Mill LMZ 2" made by Ashizawa Fine Tech Co., Ltd., having a lining made of a urethane resin on its internal surface and adopting the centrifugation method for removing alumina beads after grinding), which was filled with alumina beads (a bead diameter: 0.65 mm, a purity: 99.9% by mass) for an average residence time of 30 minutes to obtain an aqueous mixture in the state of a dispersion of the ground particles in water. The solvent was evaporated from a part of the aqueous mixture after grinding, and the residue was dried to give a powder. The resulting powder had a degree of grinding ($H(116)/H_0(116)$) of 1.08. Also the powder had a Si content of 17 ppm, a Fe content of 12 ppm, a Cu content of less than 1 ppm (lower detection limit), a Na content of 6 ppm, and a Mg content of 36 ppm.
After grinding, the aqueous mixture was subjected to centrifugal separation under centrifugal acceleration at 2,100 G (2,100 times of the acceleration of gravity) for a centrifugal processing time of 120 minutes (a product: 252,000 G·minute) to give a supernatant liquid (a solid concentration: 2% by mass). The seed crystal particles included in the resulting supernatant liquid had a center particle diameter of not more than 30 nm, and had no particles having a particle diameter of more than 30 nm (measuring method 3).
(Production of Aluminum Hydrolysate)
500 g of Aluminum hydroxide obtained by hydrolyzing high purity aluminum isoproxide, 1,339 g of the supernatant liquid obtained above (a solid concentration: 2% by mass), (an α-alumina component: 26.8 g) and 3,661 g of pure water were mixed at room temperature (about 25° C.), and the resulting mixture was irradiated with ultrasonic wave for 5 minutes. After that, the mixture was forwarded to a wet method dispersion device by a roller pump, which has a lining made of resin, and then the mixture was continuously dispersed using the wet method dispersion device ("DYNO-MILL" made by Shinmaru Enterprises Corporation, having a lining made of polyethylene on its inner surface and adopting a gap separator method for removing alumina beads after dispersing), which was filled with 2.9 kg of alumina beads (a purity: 99.9% by mass, a bead diameter: 0.65 mm), for an average residence time of 2 minutes in a wet condition. Then, the mixture was spray-dried under the conditions of an inlet temperature of 180° C., an exit temperature of 80° C., a wind pressure of 1 atm (0.1 MPa), while feeding the mixture at a rate of 1 liter/hour using a roller pump similar to the one above, to give a dry powder. The resulting dry powder was found that it was made of spherical agglomerate in which primary particles were agglomerated to others, and the agglomerate had a center particle diameter of 9.0 μm (measuring method 2), by observing with a scanning electron microscope (SEM). The dry powder included the seed crystal particles in an amount of 6.7 parts by mass based on 100 parts by mass of the metal components in terms of the oxides.
(Calcination)
The thus obtained dry powder was put in a covered alumina crucible of a purity of not less than 99.9%. It was heated from room temperature to 960° C. at a temperature elevating rate of 300° C./hour in the air in a stationary state, using a box electric furnace, and calcined at 960° C. for 3 hours to give a desired fine α-alumina particle as a calcined white powder. The fine α-alumina particle had a BET specific surface area of 19.2 m²/g, a degree of α-transformation of 97%, a degree of necking of 0%, a Si content of 17 ppm, a Fe content of 12 ppm, a Cu content of less than 1 ppm (lower detection limit), a Na content of 6 ppm, a Mg content of 36 ppm, and a W content of less than 10 ppm (lower detection limit). The observation with an SEM showed that the fine α-alumina particle was made of spherical agglomerate in which primary particles were agglomerated to others. The fine α-alumina particle was observed with a TEM, and as a result, it was found that the alumina contained no particles having a particle diameter of more than 200 nm. The fine α-alumina particle was ground in a jet mill, then its ignition loss was measured, as a result, it was 0.41%.

(Production of Sintered Body)

The fine α-alumina particle obtained above was cracked by using a jet mill whose inner surface was lined with alumina having a purity of 99% by mass to give spherical agglomerates having a center particle diameter of 2.2 μm (measuring method 2). The agglomerates were filled into a mold, which was subjected to single screw pressing under a molding pressure of 30 MPa, and then to cold isostatic pressing (CIP) for 3 minutes under a pressure of 100 MPa to give an α-alumina green body. The green body was heated to 1,400° C. at a temperature elevating rate of 200° C./hour, and sintered by keeping the temperature at 1,400° C. for 2 hours to give an α-alumina sintered body. The resulting sintered body had a density of 3.973 g/cm$^3$.

Example 2

(Production of α-alumina Slurry)

A fine α-alumina particle was obtained in the same manner as in Example 1. The resulting fine α-alumina particle 60 g was mixed with ion exchanged water 140 g and a dispersant ("SN Dispersant-5468" made by San Nopco Limited) 1 g, and the mixture was poured into a batch-type sand grinder ("4TSG-1/7(1/8)" made by Aimex Co., Ltd, whose inner surface was lined with alumina having a purity of 99.9% by mass), containing alumina beads (a diameter: 0.65 mm, a purity: 99.9% by mass) 760 g, and uniformly dispersed at 2,000 rpm for 45 minutes. After dispersing, to the resulting mixture 100 g were added an aqueous magnesium nitrate solution (made by Wako Pure Chemical Industries, Ltd., a concentration: 20% by mass) 0.46 g (magnesium nitrate: 0.09 g), a binder ("SA-200" made by Chuorika Co., Ltd., a solid content: 15% by mass) 3 g (a solid matter: 0.45 g), a binder ("Unigly" made by NOF Corporation, a solid content: 50% by mass) 0.6 g (a solid matter: 0.3 g), and a binder ("Celozole" made by Chukyo Yushi. Co., Ltd, a solid content: 18% by mass) 0.8 g (a solid matter: 0.144 g), and the mixture was stirred for 30 minutes, filtrated through a filter with a mesh of 10 μm, and stirred for further 10 minutes. After that, an aqueous aluminum sulfate solution (a solid content: 1% by mass) 11.8 g (aluminum sulfate: 0.12 g) was added dropwise thereto to adjust a viscosity of 150 mPa·s, which was stirred for further 20 minutes to give an α-alumina slurry in the state of a dispersion of fine α-alumina particle in water.

(Production of α-alumina Granules)

The α-alumina slurry obtained above was sprayed by using a spray-dryer. and dried under the conditions of an inlet temperature of 180° C. an exit temperature of 80° C., and a wind pressure of 0.1 MPa (atmospheric pressure) to give dried α-alumina granules. These α-alumina granules had a center particle diameter of 28.6 μm (measuring method 2).

(Production of Sintered Body)

An α-alumina sintered body was obtained in the same manner as in the Production of sintered body in Example 1 except that the α-alumina granules obtained above were used instead of the fine, α-alumina particle after cracking and that the pressure of cold isostatic pressing (CIP) was changed to 150 MPa. The sintered body had a density of 3.982 g/cm$^3$.

Example 3

(Production of Sintered Body)

Agglomerates of fine α-alumina particle obtained in the same manner as in Example 1 were cracked in a vibrating mill, which has an internal volume of 3.3 L and whose inner surface was lined with alumina having a purity of 99% by mass. Then, an α-alumina green body and an α-alumina sintered body were obtained in the same manner as in Example 1. The resulting sintered body had a density of 3.951 g/cm$^3$.

Comparative Example 1

(Production of Seed Crystal Particles)

To 100 parts by mass of the unground α-alumina particles obtained in Example 1, having a BET specific surface area of 14 m$^2$/g, was added a grinding aid (propylene glycol) 1 part by mass, to which a grinding medium (alumina beads having a bead diameter of 15 mm and a purity of 99.6% by mass) was added, and the mixture was ground for 12 hours on a vibrating mill to give ground α-alumina particles. The resulting ground α-alumina particles had a BET specific surface area of 16 m$^2$/g and a degree of grinding of 1.10. Also the center particle diameter of the ground α-alumina particles was about 0.1 μm (measuring method 3).

The ground α-alumlna particles obtained above 37.5 g was added to an aqueous aluminum nitrate solution (pH=2) 150 g to give a dispersion, and the dispersion was filled in a 1 liter polyethylene vessel together with alumina beads (a diameter: 2 mm, a purity: 99.9% by mass) 700 g. After the mixture was stirred, the alumina beads were filtered away to give an aqueous mixture in the sate of a dispersion of ground α-alumina particles in water.

(Production of Aluminum Hydrolysate)

An aluminum nitrate nonahydrate $(Al(NO_3)_3 \cdot 9H_2O)$ (made by Kansai Catalyst Co., Ltd., an extrapurereagent, powder) 750.26 g (2 mol) was dissolved in pure water 1,555.7 g to give a 1 mol/liter aqueous aluminum nitrate solution. To the resulting aqueous aluminum nitrate solution was added 218.6 g of the aqueous mixture including 43.7 g of the ground α-alumina particles, to which a 25% aqueous ammonia (made by Wako Pure Chemical Industries, Ltd., a guaranteed reagent) 328 g (ammonia: 82 g) was added at a feed rate of about 32 g/minute through a microrotary pump, while the mixture was stirred at room temperature (about 25° C.). When the addition was completed, the hydrolyzed product was precipitated in the state of a slurry, which had a pH of 3.8. After the addition was completed, the slurry was kept to stand at room temperature (about 25° C.) for several decades minutes to turn into a jelly. The resulting jelly was dried in a thermostatic chamber having a temperature of 60° C. for one day, and dried jelly was ground in an alumina mortar to give a powdery mixture. The resulting mixture comprised 30 parts by mass of seed crystal particles based on 100 parts by mass of the metal components in terms of the oxides.

(Calcination)

The powdery mixture obtained above was thrown into a rotary kiln through its input port at a feed rate of 20 g/minute, while the heated mixture was continuously removed from the output port of the kiln in a laboratory of 25° C. The rotary kiln is made of SUS 304 L, and has an outlet with an opening area of 38.5 cm$^2$, a length of 225 cm, an inner diameter of 212 cm and an internal volume of 79.4 L, which is made by Takasago Industry Co., Ltd. The internal space of the rotary kiln was previously placed by nitrogen gas, the in-furnace temperature at the outlet was 390° C., the in-furnace pressure was atmospheric pressure (0.1 MPa), the feed rate of nitrogen gas was 20 liter/minute in terms of 25° C., and the rotary speed was 2 rotation/minute.

After the mixture was taken from the rotary kiln, it was put in an alumina crucible, which was heated from room temperature to 920° C. at a temperature elevating rate of 300°

C./hour in a box electric furnace, and it was calcined at 920° C. for 3 hours to give a fine α-alumina particle as a white powder. The resulting fine α-alumina particle had a Si content of 300 ppm, a Fe content of 150 ppm, a Cu content of less than 1 ppm (lower detection limit), a Na content of 220 ppm, and a Mg content of 23 ppm. These elements probably originated from aluminum nitrate nonahydrate as the starting material or contaminants from the rotary kiln. The fine α-alumina particle was observed with an SEM, which showed that it was a lump, in which primary particles were cohered to others. The fine α-alumina particle had a degree of necking of 5%. After the fine α-alumina particle was ground in a jet mill, it had an ignition loss of 0.60%, a degree of α-transformation of 98%, and a BET specific surface area of 19.2 m²/g.
(Production of Sintered Body)
The fine α-alumina particle was cracked by using the same vibrating mill as used in Example 3. Then, an α-alumina green body and an α-alumina sintered body were obtained in the same manner as in Example 1. The resulting α-alumina sintered body had a density of 3.911 g/cm³.

Comparative Example 2

(Production of Fine α-alumina Particle)
An aluminum hydroxide obtained by hydrolyzing aluminum isopropoxide of high purity was calcined to give a transition alumina having a θ-phase as a main crystal phase and a degree of α-transformation of 3%. The resulting transition alumina was ground in a jet mill to give a transition alumina powder having a bulk density of 0.21 g/cm³.
The transition alumina powder was calcined at a maximum temperature of 1,170° C. for an average residence time of 3 hours in a calcining furnace in which the inside was adjusted at a dew point of −15° C. (a partial water vapor pressure: 165 Pa) by continuously throwing the powder into the furnace, and at the same time, continuously removing the calcined powder therefrom, to obtain fine α-alumina particle having a BET specific surface area of 14 m²/g. The fine α-alumina particle had a degree of α-transformation of 98%, a degree of necking of 100%, a Si content of 25 ppm, a Fe content of 17 ppm, a Cu content of less than 2 ppm (lower detection limit), a Na content of 5 ppm, a Mg content of 3 ppm, and an ignition loss of 0.45%.
(Production of Sintered Body)
Then an α-alumina green body and an α-alumina sintered body were obtained in the same manner as in the Production of sintered body in Example 1. The resulting sintered body had a density of 3.942 g/cm³.

Example 4

(Production of Seed Crystal Particles)
An aluminum hydroxide obtained by hydrolyzing aluminum isopropoxide of high purity was calcined in a electric furnace at 1160° C. to give an unground α-alumina particles. The resulting unground α-alumina particles were ground using a vibrating mil to obtain an α-alumina particles having a BET specific surface area of 10 m²/g and a degree of grinding of 1.21.
The resulting α-alumina particles 1.35 kg were dispersed in an aqueous aluminum chloride solution (an aqueous solution of aluminum chloride hexahydrate made by Wako Pure Chemical Industries, Ltd. (an extra pure reagent), 0.05 mol/liter, 1.2% by mass) 9.43 kg, by using a wet method grinding device ("Star Mill LMZ 2" made by Ashizawa Fine Tech Co., Ltd.) that was filled with alumina beads (a bead diameter: 0.5 mm, made by TAIMEI Chemicals Co., Ltd.) 2.52 kg, under conditions of an average resistance time of 8 minutes, a rotary speed of 2000 rpm and flux of 120 liter/hour, to give an aqueous mixture.

The resulting aqueous mixture was forwarded to a ceramics filter by using a pump made by IWAKI & CO. LTD. With a Impera rotary speed of 5500 rpm, and was filtered through the ceramics filter (made by NGK INSULATORS, LTD.) with amesh of 0.2 μm, and a filtrate having a solid content of 1.03 wt % and pH of 4.6 was gathered.
(Production of α-alumina Precursor)
To 929 g (696.8 g in terms of alumina) of an aluminum hydroxide obtained by hydrolyzing aluminum isopropoxide of high purity, the filtrate obtained above (a solid content: 1.03% by mass, an α-alumina component: 77.2 g) were added, and the resulting mixture was continuously dispersed using a continuous homogenlzer ("CLM-3.7S" made by M TECHNIQUE Co., Ltd.) under conditions that an average resistance time was 10 minutes and rotary speed of shaft was 9000 rpm in the wet method, to give an α-alumina precursor slurry having pH of 5.9, including particles having a center particle diameter of 0.14 μm (measuring method 1). Then, the resulting slurry was spray-dried under the conditions of an inlet temperature of 180° C., an exit temperature of 80° C., a wind pressure of 1 atm (0.1 MPa), and a feed rate of 1 liter/hour, to give a dry powder.
(Calcination and Grinding)
The thus obtained dry powder was put in a covered alumina crucible of a purity of not less than 99% at a layer height of 1 cm. It was heated from room temperature to 1020° C. at a temperature elevating rate of 150° C./hour in the air in a stationary state using a box electric furnace, and calcined at 1020° C. for 3 hours to give a calcined white powder. The resulting calcined powder had a BET specific surface area of 15.4 m²/g. The resulting calcined powder was ground by a jet mil made by NIPPON PNEUMATIC MFG. CO., LTD., to give a fine α-alumina particle having a BET specific surface area of 16.6 m²/g, a degree of α-transformation of 97%, a Si content of 18 ppm, a Fe content of 10 ppm, a Cu content of less than 1 ppm (lower detection limit). a Ka content of 15 ppm, a Mg content of less than 1 ppm (lower detection limit), and an ignition loss of 0.28%. The fine α-alumina particle was observed with a TEM, and it was found that it contained no particles having a particle diameter of more than 200 nm, and a degree of necking of it was 0%.
(Production of Sintered Body)
An α-alumina sintered body obtained using thus obtained fine α-alumina particle in a same manner as the Production of sintered body in Example 1, had a density of 3.953 g/cm³.

What is claimed is:
1. A fine α-alumina particle having a degree of α-transformation of not less than 95%, a BET specific surface area of not less than 10 m²/g, a degree of necking of not more than 30%, and a total content of Si, Fe, Cu, Na and Mg of not more than 500 ppm, wherein a ratio of particles having a particle diameter of more than 200 nm is not more than 1% in terms of the number of particles.
2. The fine α-alumina particle according to claim 1, which has an ignition loss of not more than 0.5%.
3. An α-alumina slurry in which the fine α-alumina particle according to claim 1 is in an aqueous medium.
4. α-Alumina granules, which are obtainable by spray-drying the α-alumina slurry according to claim 3.
5. An α-alumina green body, which is obtainable by shaping the fine α-alumina particle according to claim 1.
6. An α-alumina sintered body, which is obtainable by sintering the α-alumina green body according to claim 5.
7. An abrasive comprising the α-alumina slurry according to claim 3.
8. A process for producing an α-alumina sintered body comprising the steps of:
    shaping the fine α-alumina particle according to claim 1 to obtain an α-alumina green body; and
    sintering the obtained α-alumina sintered body.

9. The process according to claim 8, further comprising the steps of:
dispersing the fine α-alumina particle in an aqueous medium to obtain an α-alumina slurry;
spray-drying the obtained α-alumina slurry to obtain α-alumina granules; and
compacting the obtained α-alumina granules to obtain an α-alumina green body.

10. A process for producing a fine α-alumina particle according to claim 1, comprising the steps of:
grinding a seed crystal precursor by using a grinder to obtain seed crystal particles,
wherein the seed crystal precursor is selected from unground α-alumina particles and unground diaspore particles, which has a total content of Si, Fe, Cu, Na and Mg of not more than 500 ppm, and
the grinder has a lining made of a synthetic resin or alumina having a purity of not less than 99% on the surface with which the seed crystal precursor contacts;
mixing the obtained seed crystal particles with an α-alumina precursor having a total content of Si, Fe, Cu, Na and Mg of not more than 500 ppm to obtain a mixture; and
calcining the obtained mixture.

11. The process according to claim 10, wherein the seed crystal precursor is ground so that a half width (H) of a main peak in the range of $45° \leqq 2\theta \leqq 70°$ in X-ray diffraction spectrum is not less than 1.02 times of a half width ($H_0$) before ground, thereby to obtain the seed crystal particles.

12. The process according to claim 10 or 11, wherein the seed crystal precursor is ground in a wet method.

13. The process according to claim 11, wherein the seed crystal precursor is ground in a dry method so that the half width (H) of a main peak in the range of $45° \leqq 2\theta \leqq 70°$ in X-ray diffraction spectrum is not less than 1.06 times of the half width ($H_0$) before ground.

14. The process according to claim 11, further comprising the step of:
after the seed crystal precursor is ground, removing coarse particles through a centrifugal separation in an aqueous medium under conditions that a product of a centrifugal acceleration (G) and a centrifugal processing time (minute) is not less than 140,000(G minute) to obtain the seed crystal particles.

15. The process according to claim 11, further comprising the step of:
after the seed crystal precursor is ground, removing coarse particles through a filtration in an aqueous medium by using a filter having a pore radius of not more than 1 μm.

* * * * *